United States Patent
Camerman

[11] 4,124,658
[45] Nov. 7, 1978

[54] DEVOLATILIZATION OF STYRENE POLYMERS WITH SULFONYLHYDRAZIDES

[75] Inventor: Philippe J. A. Camerman, Wezembeek-Oppem, Belgium

[73] Assignee: Cosden Technology, Inc., Big Spring, Tex.

[21] Appl. No.: 843,845

[22] Filed: Oct. 20, 1977

[30] Foreign Application Priority Data
Oct. 21, 1976 [GB] United Kingdom ............... 43757/76

[51] Int. Cl.$^2$ ............................................... C08F 6/00
[52] U.S. Cl. ................................. 260/880 R; 526/346; 528/487; 528/492
[58] Field of Search ......................... 528/487; 526/346; 260/880 R

[56] References Cited
U.S. PATENT DOCUMENTS

| | | | |
|---|---|---|---|
| 3,325,457 | 6/1967 | Finestone et al. ................... | 528/500 |
| 3,491,071 | 1/1970 | Lanzo .................................. | 528/500 |
| 3,987,235 | 10/1976 | Fujimoto .............................. | 528/481 |
| 3,991,136 | 11/1976 | Dalton et al. ...................... | 260/880 R |

Primary Examiner—Stanford M. Levin

[57] ABSTRACT

A process for removing residual monomer from styrene based polymers is disclosed which comprises adding a sulfonylhydrazide having the general formula:

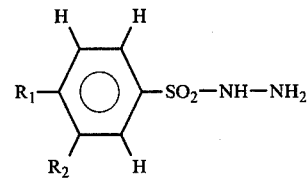

where: $R_1$ is H or an alkyl radical containing 1 to 4 carbon atoms; $R_2$ is H or a $-SO_2-NH-NH_2$, in which case $R_1$ is H; and symmetric sulfonylhydrazides of the general formulae:

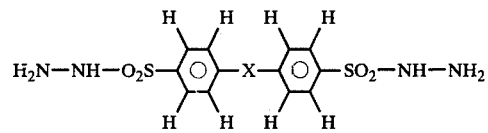

or

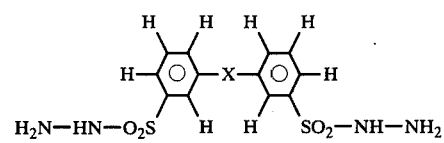

where: X is $-O-$, $-S-$, $-CH_2-$ or $-SO_2-$ and mixtures thereof to the polymer resin. Products made by adding the hydrazides to the resins are also disclosed.

12 Claims, No Drawings

DEVOLATILIZATION OF STYRENE POLYMERS WITH SULFONYLHYDRAZIDES

BACKGROUND OF THE INVENTION

1. Field of the Invention

The present invention relates to a process for purifying styrene based polymers.

2. Description of the Prior Art

By comparison with homopolymers of styrene, copolymers containing styrene offer many advantages, in particular, improved mechanical properties, lower thermal deformation and better ageing. The most generally used styrene based copolymer are:

SAN resins resulting from the copolymerization of styrene and acrylonitrile,

HIPS resins prepared by polymerizing styrene in the presence of an elastomer, typically a polybutadiene rubber, ABS resins produced from styrene, acrylonitrile and an elastomer.

For preparing these resins, conventional polymerization processes such as mass, suspension or emulsion polymerization may be used. In commercial practice, however, a two-step process is most often used. Such a process comprises a mass prepolymerization at a temperature between approximately 75° and 125° C., followed by a suspension polymerization, at a temperature in the range of approximately 75° to 150° C.

The styrene based polymers formed are thermoplastic materials and they can be molded by any conventional method. They are used, in particular, for the manufacture of various types of containers for liquid and solid products.

It has been found that when using any one of the above polymerization processes, residual monomer remains in the resin. Until now it has not been possible to carry out the polymerization on an industrial scale to the very end in order to avoid the presence of residual monomer. For instance, HIPS, SAN and ABS resins generally contain about 0.1 to 0.5% by weight of residual styrene.

For some uses, namely when these resins are used as materials for packaging of edible products, this content is too high and residual monomer migrates slowly from the container to the contents of the container. The amount of monomer which will migrate depends on the amount of residual monomer in the resin.

SUMMARY OF THE INVENTION

An object of the present invention is to provide a process for producing styrene based polymers with a substantially reduced content of residual monomers.

A further object of the invention is to form a polymer resin having a reduced monomer content for use in containers in which the risk of monomer contamination is to be reduced.

The process of the present invention for treating polymers, and in particular styrene based polymers, in order to reduce their content of residual monomers comprises adding to the resin a sulfonylhydrazide chosen from asymmetric sulfonylhydrazides of the general formula:

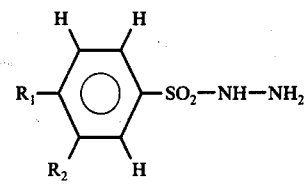

where $R_1$ is H or an alkyl radical containing 1 to 4 carbon atoms, $R_2$ is H or a $-SO_2-NH-NH_2$, in which case $R_1$ is H and symmetric sulfonylhydrazides selected from the group comprising the symmetric sulfonylhydrazides having the sulfonylhydrazide radical in the para-position of general formula

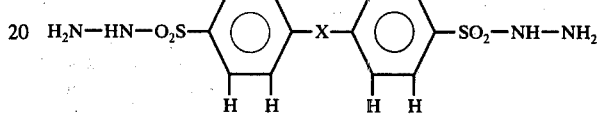

and the symmetric sulfonylhydrazides having the sulfonylhydrazide radical in the meta-position of general formula

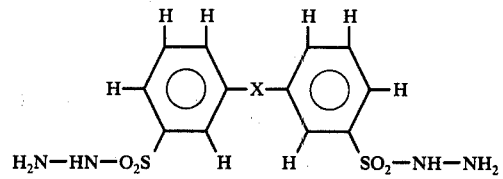

where X is $-O-$, $-S-$, $-CH_2-$ or $-SO_2$, and mixtures thereof, and heating the mixture above the decomposition temperature of the sulfonylhydrazide used.

In a preferred embodiment of the invention the mixture is kneaded in the heated state in an extruder while the temperature to which the mixture is heated is between about 50° and 100° C. above the decomposition temperature of the sulfonylhydrazide used. The invention also comprises resins made by the previously described process as well as containers and other articles of manufacture at least partially made out of purified resins of the invention.

The sulfonylhydrazides are odorless and non-toxic solids which are compatible with polymers. Moreover, they decompose on heating and the decomposition residues are non-toxic and generally colorless. The sulfonylhydrazides and their decomposition residues have no detrimental effect on the properties of the styrene based resins. Furthermore, these aromatic sulfonylhydrazides are readily available products, in contrast for example with alkylsulfonylhydrazides.

The amount of sulfonylhydrazides to be used depends on the amount of residual monomers which, on one hand, are present in the resin before treatment and which, on the other hand, are permissible in the treated resin. Accordingly, the amount of sulfonylhydrazide may be as low as 0.5 mole per mole of residual monomers in the resin before treatment. Generally, the sulfonylhydrazide is used in 1:1 molar or stoichiometric amount based on the residual monomers. The treating agent may be used in excess of this stoechiometric amount. However, use of amounts greater than approximately twice the stoichiometric amount does not yield improved results.

The sulfonylhydrazide is incorporated into the styrene based resin by physical blending of these components in a mixer or the like. According to an embodiment of the present invention, this incorporation is carried out in a single-screw or a double-screw extruder.

This incorporation treatment is carried out at a temperature which depends on the decomposition temperature of the sulfonylhydrazide used, which is, for instance:

benzenesulfonylhydrazide : 104° C. for pure product 1,3-benzenedisulfonylhydrazide: 163° C. for pure product 145° C. for commercial product p-tolylsulfonylhydrazide : 110° C.

4,4-oxybis(benzenesulfonylhydrazide): 164° C. for pure product 130° C. for commercial product 3,3-sulfobis(benzenesulfonylhydrazide): 153°–158° C.

Generally, the temperature in the extruder is about 50° to 100° C. higher than the decomposition temperature of the sulfonylhydrazide used. The residence time may vary between about 30 and 180 seconds and is generally between about 60 and 150 seconds; this residence time depending on the selected temperature in the extruder.

It has been found that the content of residual monomers in the resin which has been treated according to the process of the present invention is sharply decreased and as a result the treated resin can be used as a packaging material for edible products such as liquids without unduly risking monomer contamination.

The invention will now be further described with reference to the following examples:

EXAMPLE 1

The following materials were introduced into a single-screw extruder:
HIPS containing 0.10% by weight residual styrene
Zinc stearate: 0.06% by weight of HIPS
Lime: 0.01% by weight of HIPS
di-tert-butyl-paracresol (DBPC): 0.14% by weight of HIPS.

The mixture was extruded at a temperature of 220° C. (residence time: 110 seconds).

After extrusion, the content of residual monomer in the HIPS was 0.08%.

The same procedure was repeated except that 0.2% by weight of p-toluenesulfonylhydrazide (or about 1 mole of hydrazide per mole of residual monomer) was added to the mixture before extrusion. After conducting the extrusion in an identical manner, the content of residual monomer was 0.03%.

The results given in the following Table clearly show that although monomer content is sharply reduced as was just seen, the treatment by a sulfonylhydrazide is not detrimental to the mechanical properties of the resin. In this Table, Resin A is the HIPS which has been extruded without treatment by p-toluenesulfonylhydrazide and Resin B is the same HIPS which has been extruded after treatment by this sulfonylhydrazide.

|  | Resin A | Resin B |
| --- | --- | --- |
| Izod (aged) (ft. lb/inch) | 2.4 | 2.4 |
| Melt flow index (gr/10′ at 200° C) | 2.7 | 2.8 |
| Tensil strength yield (psi) | 3610 | 3550 |
| modulus (× 10⁵ psi) | 3.04 | 2.95 |
| Elongation (%) | 43 | 47 |
| Bends | 26 | 25 |
| Falling dart (inch-lb) | 36 | 36 |

EXAMPLE 2

The same procedure was repeated with a mixture of:
HIPS containing 0.12% of residual monomer
Zinc stearate: 0.06% by weight of HIPS
Lime: 0.01% by weight of HIPS
DBPS: 0.14% by weight of HIPS
Benzene sulfonylhydrazide: 0.2% of HIPS The extruder was heated to 160° C. and the residence time was 150 seconds. After treatment, the resin contained 0.04% by weight of residual monomer.

By way of comparison, the following hydrazides (which are outside the scope of this invention) were used instead of benzenesulfonylhydrazide and yielded the following monomer contents:

| Hydrazide | Styrene content after treatment |
| --- | --- |
| p-toluic hydrazide | 0.10 % |
| glutaric hydrazide | 0.10 % |
| salicylic hydrazide | 0.11 % |

These comparative experiments show that hydrazides which are not sulfonylhydrazides are not active and that the content of residual styrene is practically not decreased.

EXAMPLE 3

HIPS containing 0.10% of residual styrene was mixed with zinc stearate (0.06% by weight of HIPS), lime (0.01% by weight of HIPS), DBPC (0.14% by weight of HIPS) and one of the following sulfonylhydrazides:

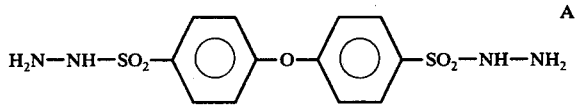

A

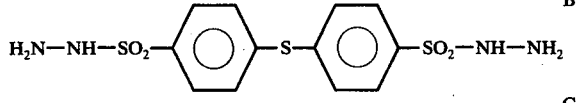

B

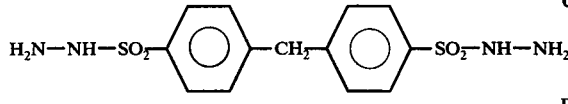

C

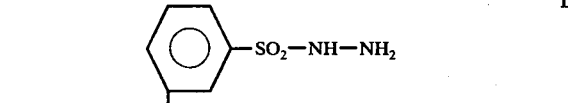

D

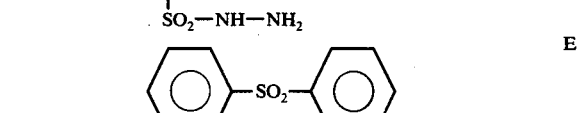

E

Each sulfonylhydrazide was used in an amount corresponding to 1.5 the stoichiometric amount, based on the residual styrene in the HIPS resin.

The remaining process conditions and the results are given in the following table:

Table

| Sulfonylhydrazide | Extrusion t°(° C) | Residence time in the extruder (sec.) | Residual Styrene after extrusion |
|---|---|---|---|
| A | 220 | 120 | 0.05 % |
| B | 240 | 150 | 0.03 % |
| C | 240 | 140 | 0.04 % |
| D | 225 | 120 | 0.04 % |
| E | 240 | 150 | 0.05 % |

EXAMPLE 4

The following materials were introduced into a single-screw extruder:
SAN resin containing 0.14% by weight of residual styrene and 0.08% by weight residual acrylonitrile
Zinc stearate: 0.07% by weight SAN resin
p-toluenesulfonylhydrazide: 0.4% by weight SAN resin After extrusion at 220° C. (residence time: about 110 seconds), the content of residual styrene was 0.05% and the content of residual acrylonitrile was 0.02%.

By way of comparison, the same procedure was repeated but in the absence of p-toluenesulfonylhydrazide. After extrusion, the contents of residual monomers were respectively 0.12% styrene and 0.07% acrylonitrile.

EXAMPLE 5

The following materials were introduced into a single-screw extruder:
ABS resin containing by weight 0.3% residual styrene
and 0.2% residual acrylonitrile
Zinc stearate: 0.07% by weight ABS resin
di-tert-butyl-paracresol: 0.1% by weight ABS resin
p-toluenesulfonylhydrazide: 0.1% by weight ABS resin After extrusion at 200° C. (residence time: 110 seconds) the contents of residual monomers were respectively, by weight, 0.06% styrene and 0.03% acrylonitrile.

The above process has been described with respect to certain proportions, temperatures, compounds and mixing apparatus. However, the process should not be construed as being limited to the particular parameters and devices disclosed since the invention extends as well to all alternatives and equivalents falling within the scope of the claims.

I claim:
1. A process for removing residual monomer from styrene based polymers selected from the group consisting of styrene homopolymers and copolymers, which comprises the steps of:
   (a) adding a sulfonylhydrazide to the polymer selected from the group consisting of: asymmetric sulfonylhydrazides of the general formula:

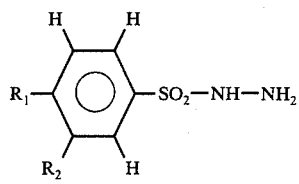

where $R_1$ is H or an alkyl radical containing 1 to 4 carbon atoms and
$R_2$ is H or a —$SO_2$-NH-$NH_2$, in which case $R_1$ is H; and symmetric sulfonylhydrazides selected from the group comprising the symmetric sulfonylhydrazides having the sulfonylhydrazide radical in the para-position of general formula

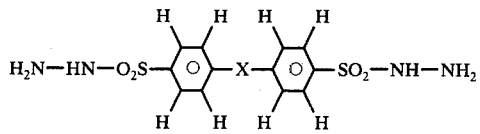

and the symmetric sulfonylhydrazides having the sulfonylhydrazide radical in the meta position of general formula

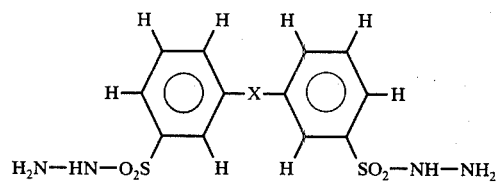

where X is —O—, —S—, —$CH_2$— or $SO_2$— and mixtures thereof; and
   (b) heating the mixture to a temperature above the decomposition temperature of the sulfonylhydrazide used.

2. A process as defined by claim 1, wherein the polymer-sulfonylhydrazide mixture is kneaded in its heated state.

3. The process as defined by claim 2, wherein said polymer-sulfonylhydrazide mixture is kneaded in an extruder.

4. The process as defined by claim 3, wherein the residence time of said polymer-sulfonylhydrazide mixture in said extruder is between 30 and 180 seconds.

5. The process as defined by claim 4, wherein said residence time is between 60 and 150 seconds.

6. The process as defined by claim 5, wherein said sulfonylhydrazide is added to said polymer in an amount between about 0.5 and about 2 moles per mole of residual monomer in said polymer resin.

7. The process as defined by claim 6, wherein said sulfonylhydrazide is added in an amount corresponding to the stoichiometric amount based on the residual monomers in the polymer.

8. The process as defined by claim 1, wherein said sulfonylhydrazide is added to said polymer in an amount between about 0.5 and about 2 moles per mole of residual monomer in said polymer.

9. The process as defined by claim 1, wherein said polymer-sulfonylhydrazide mixtures are heated to temperatures between 150° and 250° C.

10. The process as defined by claim 1, wherein said styrene polymers are SAN polymers, HIPS polymers, ABS polymers or mixtures thereof.

11. The process as defined by claim 1, wherein said mixture is heated to a temperature about 50° to 100° C. higher than the decomposition temperature of the sulfonylhydrazide used.

12. A process of purifying polymers of their monomer content which comprises the steps of:
   (a) adding a sulfonylhydrazide to the polymer selected from the group consisting of:

asymmetric sulfonylhydrazides of the general formula:

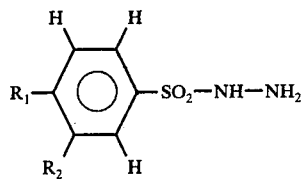

where $R_1$ is H or an alkyl radical containing 1 to 4 carbon atoms and $R_2$ is H or a $SO_2-NH-NH_2$, in which case $R_1$ is H; and symmetric sulfonylhydrazides selected from the group comprising the symmetric sulfonylhydrazides having the sulfonylhydrazide radical in the para-position of general formula

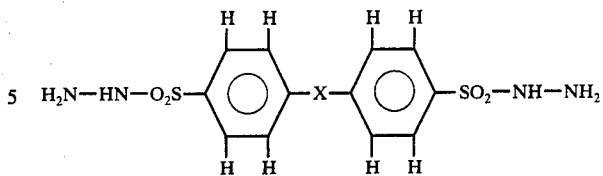

and the symmetric sulfonylhydrazides having the sulfonylhydrazide radical in the meta position of general formula

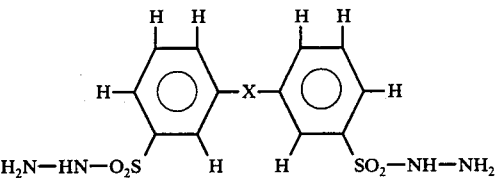

where X is $-O-$, $-S-$, $-CH_2$ or $-SO_2$, and mixtures thereof, in an amount of between 0.5 and 2 moles per mole of residual monomer;
(b) heating the polymer-sulfonylhydrazide mixture to a temperature above the decomposition temperature of said sulfonylhydrazide; and
kneading said polymer-sulfonylhydrazide mixture in an extruder at said elevated temperature for between 30 and 180 seconds to yield a purified polymer.

* * * * *